(12) United States Patent
Lin et al.

(10) Patent No.: US 10,764,985 B2
(45) Date of Patent: Sep. 1, 2020

(54) DRIVE CIRCUIT FOR TRANSMITTING DATA SIGNALS ON POWER WIRE

(71) Applicant: DONGGUAN CITY MINLEON ELECTRONICS CO., LTD., Guangdong (CN)

(72) Inventors: Hao Lin, Guangdong (CN); Lisheng Chen, Guangdong (CN); Fengcheng Lin, Guangdong (CN); Bai Lin, Guangdong (CN)

(73) Assignee: DONGGUAN CITY MINLEON ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 15/444,348

(22) Filed: Feb. 28, 2017

(65) Prior Publication Data

US 2018/0183315 A1    Jun. 28, 2018

(30) Foreign Application Priority Data

Dec. 28, 2016  (CN) .......................... 2016 1 1237999

(51) Int. Cl.
*H05B 47/185* (2020.01)
*H05B 47/18* (2020.01)

(52) U.S. Cl.
CPC ........... *H05B 47/185* (2020.01); *H05B 47/18* (2020.01); *Y02B 20/345* (2013.01); *Y02B 20/347* (2013.01)

(58) Field of Classification Search
CPC .... H02M 1/08; H02M 7/217; H05B 33/0815; H05B 33/0827; H05B 37/0263; H05B 47/185; H05B 47/18; H05B 45/00; Y02B 20/345; Y02B 20/347
See application file for complete search history.

(56) References Cited

U.S. PATENT DOCUMENTS

| | | | | |
|---|---|---|---|---|
| 2013/0271032 A1* | 10/2013 | Hua | ........................ | H05B 45/37 315/297 |
| 2015/0035450 A1* | 2/2015 | Werner | .................. | H05B 45/10 315/291 |
| 2016/0198551 A1* | 7/2016 | Kelly | .................. | H05B 47/185 315/291 |

* cited by examiner

*Primary Examiner* — Raymond R Chai

(57) ABSTRACT

This invention discloses a drive circuit for transmitting data signals on power wire, and such drive circuit comprises: a DC power module, a switching circuit module, a voltage division clamping circuit, a receiving module and a control circuit module; after the switching circuit module and the voltage division clamping circuit module are connected in parallel, one end of them is connected to one end of receiving module, and the other end is connected to one end of DC power module; the other end of receiving module is connected to the other end of DC power module; the control circuit module is connected to the switching circuit module, and controls the conduction and disconnection of switching circuit module; when the switching circuit module is conducted, the DC power module will apply a high voltage to the receiving module through the switching circuit module, and when the switching circuit module is disconnected, the DC power module will apply a low voltage to the receiving module through the voltage division clamping circuit module.

5 Claims, 5 Drawing Sheets

DRIVE CIRCUIT FOR TRANSMITTING DATA SIGNALS ON POWER WIRE

BACKGROUND OF THE INVENTION

This invention relates to the signal transmission technology field, and particularly relates to a drive circuit for transmitting data signals on power wire.

Currently, in many application fields, signals are transmitted to the part for receiving signals through special signal line, but such setting needs special signal line, and causes many problems, such as there are too many signal lines on interface, wiring is difficult, installation and decoration is inconvenient, the line cost is high, the workload is heavy, the wiring of circuit boards is congested, sometimes there are too many lines and it is required to add the wiring layer.

How to use the power wire to transmit data signals so as to save the lines and reduce the complexity of wiring is a pressing problem.

BRIEF SUMMARY OF THE INVENTION

This invention provides a drive circuit for transmitting data signals on power wire, and the drive circuit controls the connection and disconnection of switching circuit by controlling the circuit, and indirectly controls the voltage outputted by DC power supply to the receiving terminal, so as to transmit the information, and the receiving terminal collects the data signals according to the voltage change.

To achieve the above purpose, this invention adopts the following technical plan:

A drive circuit for transmitting data signals on power wire, which comprises: A DC power module, a switching circuit module, a voltage division clamping circuit, a receiving module and a control circuit module; after the switching circuit module and the voltage division clamping circuit module are connected in parallel, their one end is connected to one end of receiving module, and the other end is connected to one end of DC power module; the other end of receiving module is connected to the other end of DC power module; the control circuit module is connected to the switching circuit module, and controls the conduction and disconnection of switching circuit module; when the switching circuit module is conducted, the DC power module will apply a high voltage to the receiving module through the switching circuit module, and when the switching circuit module is disconnected, the DC power module will apply a low voltage to the receiving module through the voltage division clamping circuit module.

The switching circuit module is a NMOS transistor, the source electrode of the NMOS transistor is connected to the cathode of the DC power module, the drain electrode of the NMOS transistor is connected to the output end of the receiving module, the grid electrode of the NMOS transistor is connected to the control signal output end of the control circuit module; and the input end of the receiving module is connected to the anode of the DC power module; or The switching circuit module is a PMOS transistor, the source electrode of the PMOS transistor is connected to the anode of DC power module, the drain electrode of the PMOS transistor is connected to the input end of the receiving module, the grid electrode of the PMOS transistor is connected to the control signal output end of the control circuit module; and the output end of the receiving module is connected to the cathode of the DC power module.

The control circuit module is a microcontroller unit, the VCC end and GND end of the microcontroller unit are connected to a voltage regulator diode (D2) in parallel, the VCC end of the microcontroller unit is connected to the cathode of the voltage regulator diode (D2), and the GND end of the microcontroller unit is connected to the anode of the voltage regulator diode (D2).

The voltage division clamping circuit module contains the voltage divider resistor (R2) and the voltage regulator diode (D3);

If the switching circuit module is a NMOS transistor, the cathode of the voltage regulator diode (D3) is connected to the anode of DC power module, the anode of the voltage regulator diode (D3) is connected to one end of the voltage divider resistor (R2) and the output end of the receiving module, the other end of the voltage divider resistor (R2) is connected to VCC end of the microcontroller unit, and GND end of the microcontroller unit is connected to the cathode of DC power module;

If the switching circuit module is a PMOS transistor, one end of the voltage divider resistor (R2) is connected to the GND end of the microcontroller unit, the other end of the voltage divider resistor (R2) is connected to the cathode of the voltage regulator diode (D3) and the input end of the receiving module, the anode of the voltage regulator diode (D3) is connected to the cathode of DC power module; and the VCC end of the microcontroller unit is connected to the anode of DC power module.

The drive circuit also includes a filter circuit module, which contains the resistor (R3) and the capacitor (C3); one end of the resistor (R3) and one end of the capacitor (C3) are connected to the anode of DC power module, and the other end of the resistor (R3) and the other end of the capacitor (C3) are connected to the cathode of DC power module;

VCC end and GND end of the microcontroller unit are connected to the resistor (R1) and the capacitor (C1) in parallel;

The side of the receiving module connected to the voltage division clamping circuit module is connected to the capacitor (C2) in parallel and is connected to the diode (D1) in series; if the switching circuit module is a NMOS transistor, the output end of the receiving module is connected to the anode of the diode (D1), the cathode of the diode (D1) is connected to one end of the capacitor (C2) and the anode of the voltage regulator diode (D3), and the other end of the capacitor (C2) is connected to the input end of the receiving module; if the switching circuit module is a PMOS transistor, the input end of the receiving module is connected to the cathode of the diode (D1), the anode of the diode (D1) is connected to the cathode of the voltage regulator diode (D3) and one end of the capacitor (C2); the other end of the capacitor (C2) is connected to the output end of the receiving module.

The DC power module is a constant-current source.

The receiving module is LED lamp beads which are connected in series or in parallel, the anode of the LED lamp beads is the input end of the receiving module, and the cathode of the LED lamp beads is the output end of the receiving module.

The DC power module is an AC-DC constant-voltage source.

The receiving module is LED lamp beads which are connected in series or in parallel and are connected to the limited current circuit module in series, the anode of the LED lamp beads is the input end of the receiving module, the cathode of the LED lamp beads is connected to the input end of the limited current circuit module, and the output end of the limited current circuit module is the output end of the receiving module.

The limited current circuit module comprises the resistor (R4), the resistor (R5), the triode (Q1) and the triode (Q2); one end of the resistor (R4) and the collector electrode of the triode (Q2) are connected to the input end of the limited current circuit module, the other end of the resistor (R4) is connected to the base electrode of the triode (Q2) and the collector electrode of the triode (Q1), the emitter electrode of the triode (Q2) is connected to the base electrode of the triode (Q1) and one end of the resistor (R5); the emitter electrode of the triode (Q1) and the other end of the resistor (R5) are connected to the output end of the limited current circuit module.

Compared with the prior art, the beneficial effect of this invention is: it changes the voltage applied by DC power supply to both ends of the receiving terminal by controlling the conduction and disconnection of switch control circuit, and when the switch control circuit is conducted, the voltage across the receiving terminal is high voltage, and when the switch control circuit is disconnected, the voltage across the receiving terminal will be clamped at low voltage through the voltage division clamping circuit, and this invention controls the connection and disconnection of the switch control circuit, and indirectly controls the voltage outputted by DC power supply to the receiving terminal so as to transmit the information, and the receiving terminal extracts the data signals according to the voltage change, so as to transmit the data signals on DC power wire.

DETAILED DESCRIPTION OF THE INVENTION

To make clear the technical problems solved by this invention, the adopted technical plan and the achieved technical effect, the following will give further detailed description about the technical plan for examples of this invention with the drawings. Obviously, the described examples are just part of the examples of this invention and are not all examples. All the other examples obtained by technicians of this field based on examples of this invention under the condition of doing no creative work are within the protection scope of this invention.

Figure 1:
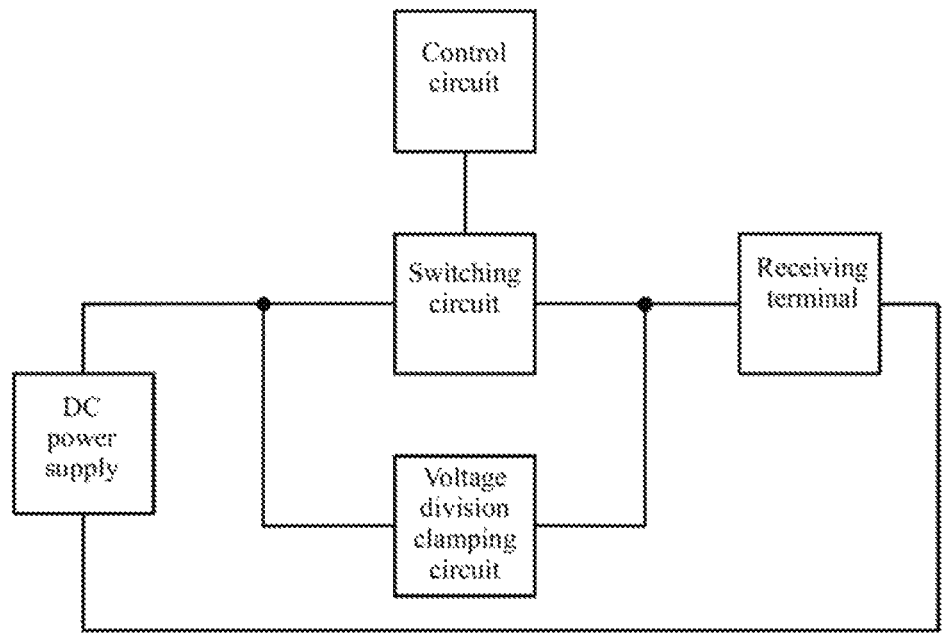
FIG. 1 is the structure block diagram I of the drive circuit for transmitting data signals on power wire provided by this invention.
Figure 2:
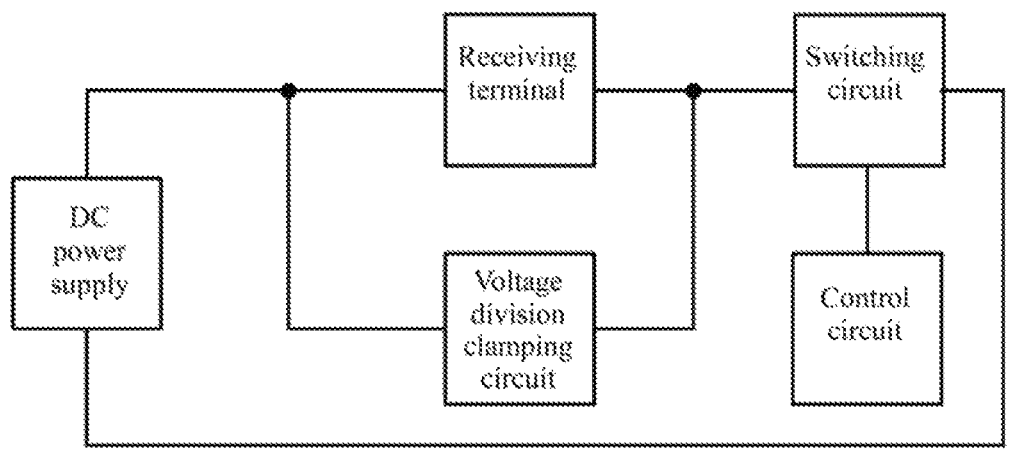
FIG. 2 is the structure block diagram II of the drive circuit for transmitting data signals on power wire provided by this invention.

Please refer to FIG. 1-2. FIG. 1 is the structure block diagram I of the drive circuit for transmitting data signals on power wire provided by this invention; FIG. 2 is the structure block diagram II of the drive circuit for transmitting data signals on power wire provided by this invention; the drive circuit for transmitting data signals on power wire comprises: a DC power supply, which is used to convert the input alternating current into direct current; a switching circuit, which is connected between DC power supply and receiving terminal; a voltage division clamping circuit, which is connected between DC power supply and receiving terminal; and a control circuit, which is connected to the switching circuit, so as to control the connection and disconnection of the switching circuit; when the switching circuit is connected, the DC power supply applies a high voltage to the receiving terminal through the switching circuit, and when the switching circuit is disconnected, the DC power supply applies a low voltage to the receiving terminal through the voltage division clamping circuit. The difference between FIG. 1 and FIG. 2 is: in FIG. 1, the DC power supply first passes through the switching circuit and then goes to the receiving terminal; while in FIG. 2, the DC power supply first passes through the receiving terminal and then goes to the switching circuit, and the voltage division clamping circuit is adjusted appropriately. It needs to be explained that, the high voltage and low voltage in this example are relative between themselves, namely, the voltage which is applied to the receiving terminal by the DC power supply through the switch circuit when the switching circuit is connected, is higher than the voltage which is applied to the receiving terminal by the DC power supply through the voltage division clamping circuit when the switching circuit is disconnected.

The example of this invention transmits the information by controlling the connection and disconnection of switching circuit through the control circuit, and thus indirectly controlling the voltage applied by DC power supply to the receiving terminal, and the receiving terminal extracts the data signals according to the voltage change, so as to transmit the data signals on DC power wire.

Figure 3:
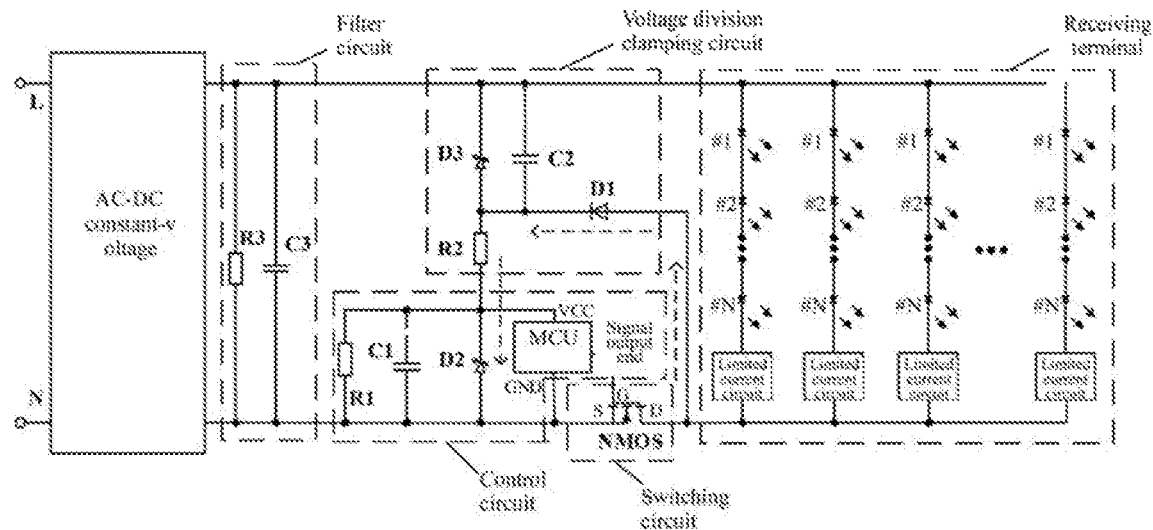
FIG. 3 is the circuit diagram I of the drive circuit for transmitting data signals on power wire provided by this invention.
Figure 4:
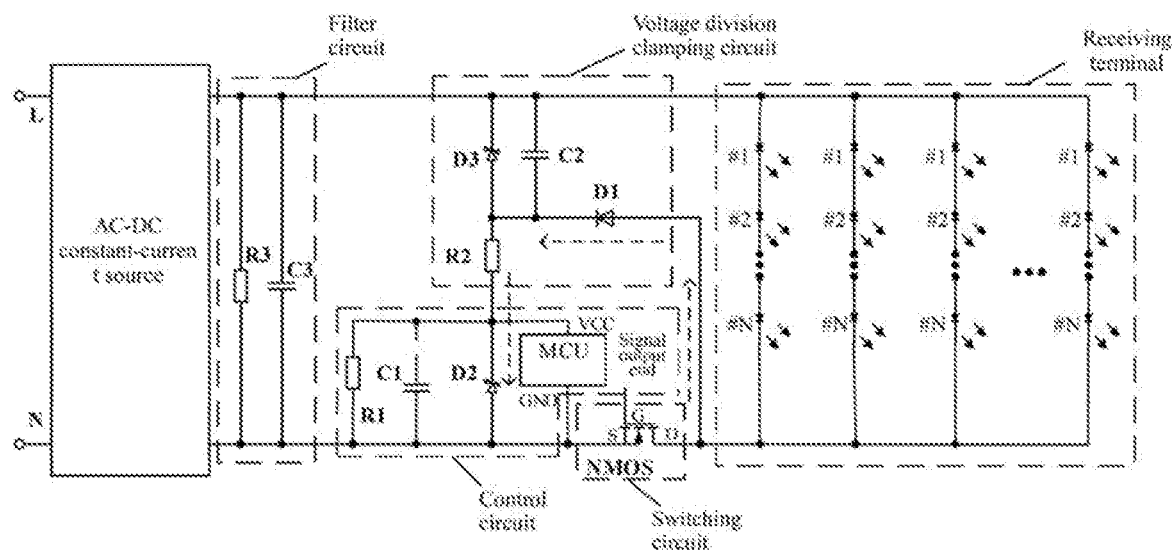
FIG. 4 is the circuit diagram II of the drive circuit for transmitting data signals on power wire provided by this invention.
Figure 5:
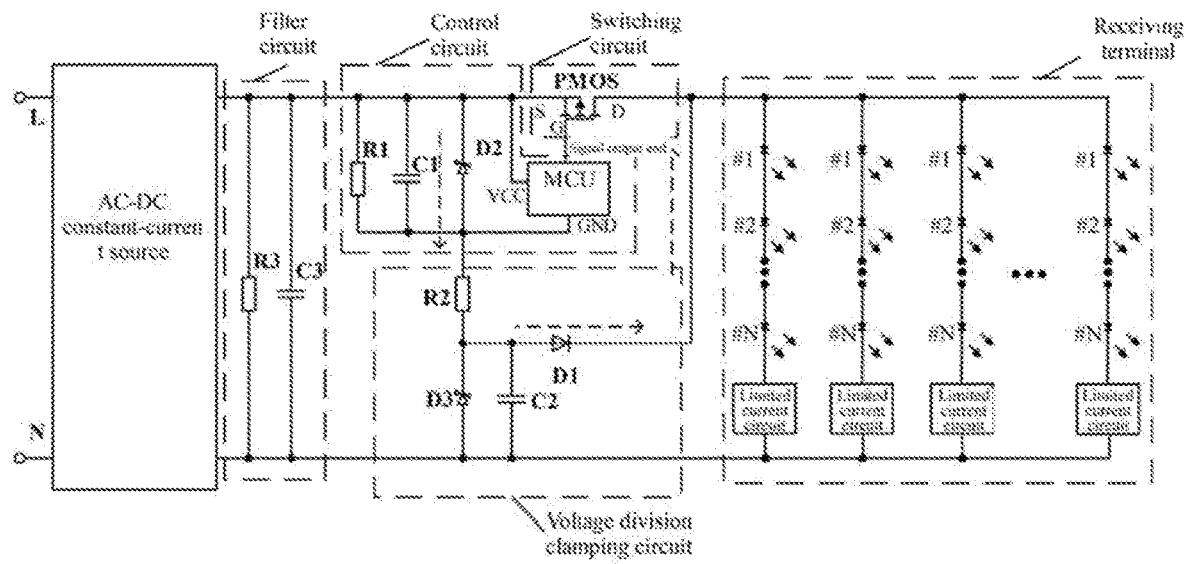
FIG. 5 is the circuit diagram III of the drive circuit for transmitting data signals on power wire provided by this invention.
Figure 6:
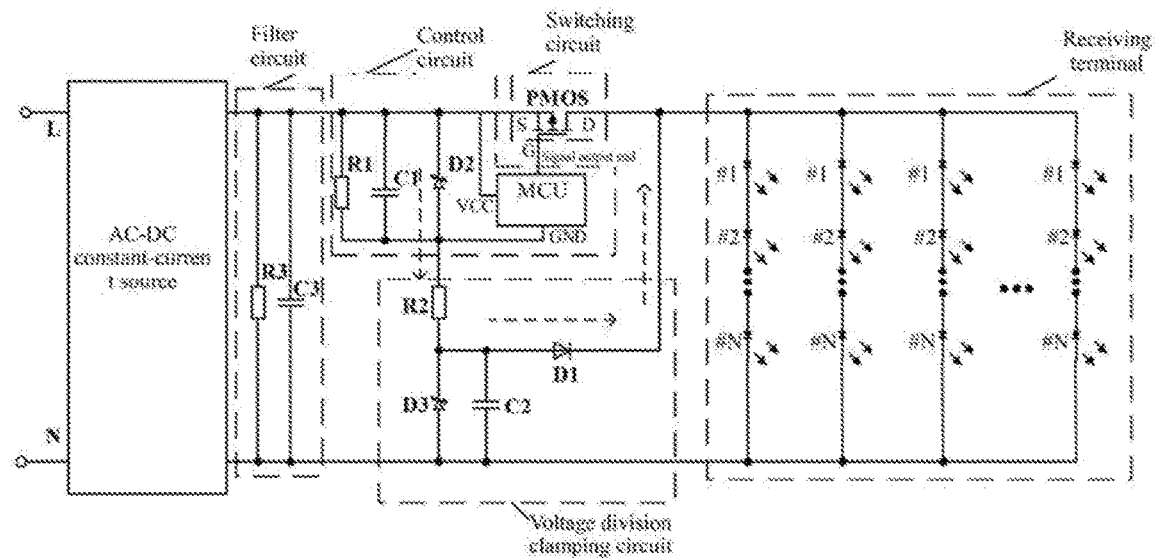
FIG. 6 is the circuit diagram IV of the drive circuit for transmitting data signals on power wire provided by this invention.

Please refer to FIG. 3-6. FIG. 3 and FIG. 4 are NMOS-based drive circuit, and FIG. 5 and FIG. 6 are PMOS-based drive circuit.

As shown in FIG. 3 and FIG. 4, the switch circuit is a NMOS transistor. The source electrode (S-electrode) of the NMOS transistor is connected to the cathode of the DC power supply, the drain electrode (D-electrode) of the NMOS transistor is connected to the output end of the receiving terminal, the grid electrode (G-electrode) of the NMOS transistor is connected to the control signal output end of the control circuit; and the input end of the receiving terminal is connected to the anode of the DC power supply; or As shown in FIG. 5 and FIG. 6, the switching circuit is a PMOS transistor. The source electrode (S-electrode) of the PMOS transistor is connected to the anode of the DC power supply, the drain electrode (D-electrode) of the PMOS transistor is connected to the input end of the receiving terminal, the grid electrode (G-electrode) of the PMOS transistor is connected to the control signal output end of the control circuit; and the output end of the receiving terminal is connected to the cathode of the DC power supply.

The control circuit is a microcontroller unit (MCU). The VCC end and GND end of the microcontroller unit are connected to a voltage regulator diode D2 in parallel, the VCC end of the microcontroller unit is connected to the cathode of the voltage regulator diode D2, and the GND end of the microcontroller unit is connected to the anode of the voltage regulator diode D2. It needs to be explained that, the voltage regulator diode D2 makes the VCC end and GND end of the microcontroller unit clamped at 3.3V-5V, so as to ensure normal work of the microcontroller unit.

The voltage division clamping circuit contains the voltage divider resistor R2 and the voltage regulator diode D3;

As shown in FIG. 3 and FIG. 4, if the switching circuit is a NMOS transistor, the cathode of the voltage regulator diode D3 is connected to the anode of DC power supply, the anode of the voltage regulator diode D3 is connected to one end of the voltage divider resistor R2 and the output end of the receiving terminal, the other end of the voltage divider resistor R2 is connected to the VCC end of the microcontroller unit, and the GND end of the microcontroller unit is connected to the cathode of DC power supply;

As shown in FIG. 5 and FIG. 6, if the switching circuit is a PMOS transistor, one end of the voltage divider resistor R2 is connected to the GND end of the microcontroller unit, the other end of the voltage divider resistor R2 is connected to the cathode of the voltage regulator diode D3 and the input end of the receiving terminal, and the anode of the voltage regulator diode D3 is connected to the cathode of DC power supply; and the VCC end of the microcontroller unit is connected to the anode of DC power supply.

As shown in FIG. 3-6, the drive circuit also includes a filter circuit, The filter circuit contains the resistor R3 and the capacitor C3; one end of the resistor R3 and one end of the capacitor C3 are connected to the anode of DC power supply; the other end of the resistor R3 and the other end of the capacitor C3 are connected to the cathode of DC power supply. It needs to be explained that, since the capacitor C3 filters DC power supply, the voltage/current between anode and cathode of DC power supply is stable, and the function of R3 is to make the capacitor discharge path when the DC power supply is disconnected, and the capacitor C3 discharges electricity from the resistor R3. Because the capacitor C3 starts to supply power after the DC power supply is disconnected, it just relies on the power consumption of the load on the receiving terminal, and it takes a very long time to finish discharging the electricity. If the electricity is discharged slowly, the load on the receiving terminal has not been powered off thoroughly when the capacitor C3 starts to supply power, and if the system is electrified again, the load on the receiving terminal might work abnormally.

Preferably, the VCC end and GND end of the microcontroller unit are connected to the resistor R1 and the capacitor C1 in parallel; since the capacitor C1 filters DC power supply, the voltage/current between VCC end and GND end of the microcontroller unit is stable, and the function of R1 is to make the capacitor discharge path when the DC power supply is disconnected, and the capacitor C1 discharges electricity from the resistor R1. Because the capacitor C1 starts to supply power after the DC power supply is disconnected, it just relies on the power consumption of the microcontroller unit, and it takes a very long time to finish discharging the electricity. If the electricity is charged slowly, the microcontroller unit has not been powered off thoroughly when the capacitor C1 starts to supply power, and if the system is electrified again, the microcontroller unit might work abnormally.

The side of the receiving terminal connected to the voltage division clamping circuit is connected to the capacitor C2 in parallel and is connected to the diode D1 in series; if the switching circuit is a NMOS transistor, the output end of the receiving terminal is connected to the anode of the diode D1, the cathode of the diode D1 is connected to one end of the capacitor C2 and the anode of the voltage regulator diode D3, and the other end of the capacitor C2 is connected to the input end of the receiving terminal; if the switching circuit is a PMOS transistor, the output end of the receiving terminal is connected to the cathode of the diode D1, the anode of the diode D1 is connected to the cathode of the voltage regulator diode D3 and one end of the capacitor C2, and the other end of the capacitor C2 is connected to the output end of the receiving terminal. The diode D1 is used to control the current direction, and the capacitor C2 is used to stabilize the voltage across the receiving terminal.

The basic principle of the example in this invention is: when the microcontroller unit controls the NMOS to be connected, the current flows from the anode of the DC power supply to the receiving terminal, and then to the cathode of the DC power supply, and the voltage across the receiving terminal is high voltage; when the microcontroller unit controls the NMOS to be disconnected, the current flows from the anode of the DC power supply to the receiving terminal, the diode D1, the resistor R2, the voltage regulator diode D2, and then to the cathode of the DC power supply. Due to the action of the voltage regulator diode D3, the voltage across the receiving terminal is clamped at low voltage. As shown in FIG. 3 and FIG. 4, this example controls the connection and disconnection of NMOS, and indirectly controls the voltage outputted by the DC power supply, so as to transmit the information, and the receiving terminal collects the data signals according to the voltage change. Or when the microcontroller unit controls PMOS to be connected, the current flows from the anode of the DC power supply to the receiving terminal, and then goes to the cathode of the DC power supply, and the voltage across the receiving terminal is high voltage; when the microcontroller unit controls PMOS to be disconnected, the current flows from the anode of the DC power supply to the diode D2, the resistor R2, the diode D1, and the receiving terminal, and then goes to the cathode of the DC power supply. Due to the action of the voltage regulator diode D3, the voltage across the receiving terminal is clamped at low voltage, as shown in FIG. 3 and FIG. 4. This example controls the connection and disconnection of PMOS, and indirectly controls the voltage outputted by the DC power supply, so as to transmit the information, and the receiving terminal collects the data signals according to the voltage change.

Wherein, the DC power supply is a constant-current source, as shown in FIG. 4 and FIG. 6. The receiving terminal is a LED light bar which is connected to N number of LED light beads in series or in parallel, the anode of the LED light bar is the input end of the receiving terminal, the cathode of the LED light bar is the output end of the receiving terminal, and N is a positive integer. As another example, the receiving terminal is at least two LED bars which are connected to N number of LED lights beads in series or in parallel; the end of each LED light bar with their anode connected in parallel is the input end of the receiving terminal, the end of each LED light bar with their cathode connected in parallel is the output end of the receiving terminal, and N is a positive integer.

Wherein, the DC power supply is an AC-DC constant-voltage source, as shown in FIG. 3 and FIG. 5. The receiving terminal is a LED light bar which is connected to the limited current circuit in series and is connected to N number of LED light beads in series or in parallel, the anode of the LED light bar is the input end of the receiving terminal, the cathode of the LED light bar is connected to the input end of the limited current circuit, and the output end of the limited current circuit is the output end of the receiving terminal. As another example, the receiving terminal is at least two LED light bars which are connected to the limited current circuit in series and are connected to N number of LED light beads in series or in parallel; the end of each LED light bar with their anode connected in parallel is the input end of the receiving terminal, the cathode of each LED light bar is connected to the input end of a limited current circuit, and the end of each limited current circuit with their output end connected in parallel is the output end of the receiving terminal.

Figure 7:
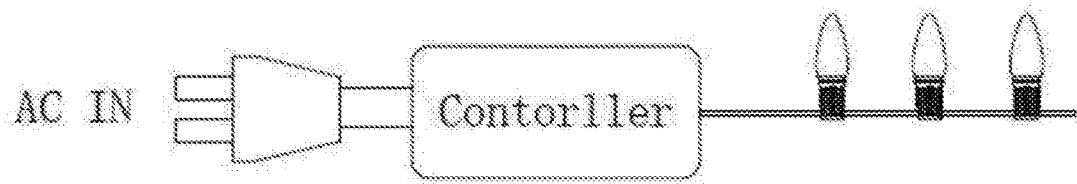
FIG. 7 the example diagram of connection between the drive circuit for transmitting data signals on power wire provided by this invention and the mini light bar.
Figure 8:
FIG. 8 is the example diagram of connection between the drive circuit for transmitting data signals on power wire provided by this invention and the LED bar of LED lamp beads.

As shown in FIG. 7-8, the drive circuit for transmitting data signals on power wire provided by this invention can be applied to mini light bars or the LED light bars of LED bulbs, so that the mini light bars or the LED bars of LED bulbs will have good changing effect.

Figure 9:
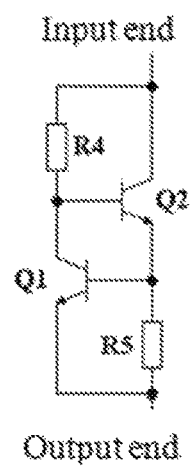
FIG. 9 is the circuit diagram of a limited current circuit provided by this invention.

FIG. 9 shows the circuit diagram of a limited current circuit provided by this invention. The limited current circuit comprises the resistor R4, the resistor R5, the triode Q1 and the triode Q2; one end of the resistor R4 and the collector electrode of the triode Q2 are connected to the input end of the limited current circuit; the other end of the resistor R4 is connected to the base electrode of the triode Q2 and the collector electrode of the triode Q1; the emitter electrode of the triode Q2 is connected to the base electrode of the triode Q1 and one end of the resistor R5; the emitter electrode of the triode Q1 and the other end of the resistor R5 are connected to the output end of the limited current circuit.

That is to say, the DC power supply can be a constant-current source or an AC-DC constant-voltage source.

If the DC power supply is an AC-DC constant-voltage source, the alternating current outputs constant voltage after going through the AC-DC constant-voltage source. The end of each LED light bar needs to be connected to the limited current circuit, as shown in FIG. 1 and FIG. 3. When NM1 (i.e. NMOS) or PM1 (i.e. PMOS) is connected, both ends of LED light bar are connected constantly at the high voltage Uon=U−Uds (Uon is the voltage between both sides of light bar, U is the output voltage of constant-voltage source, Uds is the break-over voltage of MOS transistor, and the voltage between both sides of the light bar is the difference between the output voltage of constant-voltage source and the break-over voltage of one MOS transistor), and the LED light bead will give out light. However, as the clamping voltage among the light beads has difference, the total clamping voltage of each light bar is different. Take 24 lights as an example, the standard voltage is 80V, the voltage of some light bars is about 80V, the voltage of other bars might be only 70V, and because the branch voltage of the light beads on such light bar is greater than the normal clamping voltage of 400 mV, the current through the chip is too high, and the chip will be burnt out easily, a limited current circuit is added at the end of LED light bar to absorb the excess voltage. When the NMOS or PMOS is disconnected, due to the existence of the voltage regulator diode D3, the voltage across LED light bar is clamped at low voltage, and will not give out light. Then the current $I_{R2}=I_{D3}+I_{LED}$ ($I_{R2}$ is the current through R2, $I_{D3}$ is the current through D3, and $I_{LED}$ is the current through LED light), and the resistance $R2=(U-U_{D2}-U_{D3})/I_{R2}$ ($U_{D2}$ is the voltage between both sides of D2, and $U_{D3}$ is the voltage between both sides of D3).

If the DC power supply is a constant-current source, the alternating current outputs constant current after going through the constant-current drive, and the structure of drive circuit is the same as the drive circuit of constant-voltage source. The end of each LED light bar does not need to be connected to the limited current circuit, as shown in FIG. 2 and FIG. 4. When the NMOS or PMOS is connected, both ends of the LED light bar are connected constantly to the constant-current output, the LED light bead will give out light, and the voltage across the LED light bar is determined by multiplying the number of the light beads by the clamping voltage of the LED light beads. When the NMOS or PMOS is disconnected, the voltage across the LED light bar is clamped at the low voltage $U_{D3}$ and it will not give out light. As the resistance of the resistor $R2=(U-U_{D2}-U_{D3})/I_{R2}$, at the moment when the MOS transistor is closed, the $I_{LED}$ with high current will be applied to both ends of R2 suddenly, and the voltage $U_{R2}$ ($U_{R2}$ is the voltage between both sides of R2) of the resistor will rise suddenly. At such moment, it needs to select the higher capacitor C3 to stabilize the voltage, and when $U_{R2}>U_{C3}$ ($U_{C3}$ is the voltage between both sides of C3), the capacitor C3 is charging, and it is only required to ensure that when the NMOS or PMOS is disconnected, the voltage across the capacitor C3 is basically unchanged. Therefore, the calculation method of the divider resistance of R2 is consistent with the drive circuit of constant-voltage source.

Figure 10:
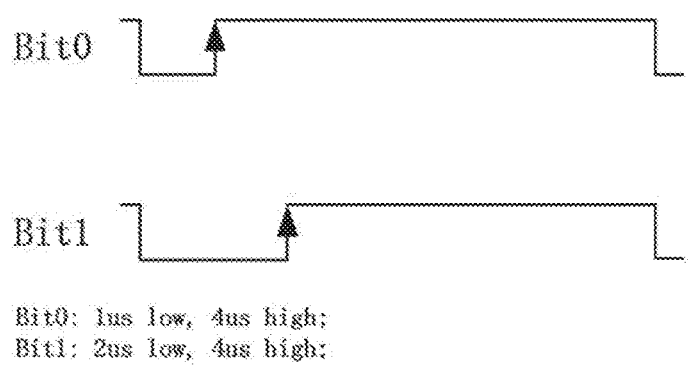
FIG. 10 is the definition of data Bit0 and data Bit1 provided by this invention.
Figure 11:
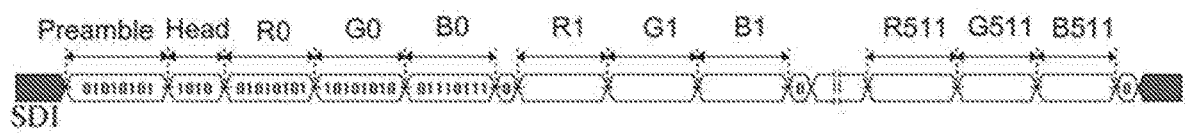
FIG. 11 is a data frame format provided by this invention.

As an example, the drive circuit provided by this invention can be used to send data signals to the LED light bars. The definition of data Bit0 and data Bit1 is shown in FIG. 10, the data of continuous 1 μs low and 4 μs high means Bit0, the data of continuous 2 μs low and 4 μs high means Bit1, and user can also define other Bit0 and Bit1. This invention controls the connection and disconnection of the MOS through the microcontroller unit so as to transmit data signals. The data frame format is shown in FIG. 9. In one data frame, the preamble+head+node RGB data+check bit (bit0) constitute a complete frame of data, one frame contains 512 nodes at most, and they can be used to drive 512 RGB tri-colored LED light beads; the chip in LED light bead receives the data signals sent by the microcontroller unit, and controls the gray scale of LED light bead according to the data signals.

Wherein, the preamble is an 8 bit data, the head is a 4 bit data, and they represent the data frame type, as shown in Table 1.

TABLE 1

Correspondence Between Head and Data Frame Type

| Header | Type Define | Description |
| --- | --- | --- |
| 4'b1010 | RGB_FRAME | Data frame, {R, G, B} = Data #1[23:0] |
| 4'b1000 | PROG_ID | Burning chip address CHIPID, Data #1[7:0] |
| 4'b0110 | CURR_TT | Test frame, not needing to match the chip address, directly change RGB gray scale. |

RGB data totally has 25 bits (from high bit to low bit, the high bit is sent first), among which, 24 bits are RGB three-channel gray data, 8 bit 256-scale gray for each channel, and the final 1 bit0 is check bit.

In conclusion, this invention concerns a drive circuit for transmitting data signals on power wire; when the microcontroller unit controls the NMOS/PMOS transistor to be connected, the voltage across the receiving terminal is high voltage; when the microcontroller unit controls the NMOS/PMOS transistor to be disconnected, due to the action of the voltage divider resistor R2 and the voltage regulator diode D3, the voltage across the receiving terminal is clamped at low voltage. By controlling the connection and disconnection of NMOS/PMOS transistor, the drive circuit indirectly controls the voltage applied by the DC power supply to the receiving terminal, so as to transmit the information, and the receiving terminal collects the data signals according to the voltage change, so as to transmit the data signals on DC power wire. The drive circuit provided by this invention can be used to drive the LED light beads connected in series or in parallel, and each LED light bead connected in series or in parallel can collect the data signals according to the voltage change, so as to change the gray scale of the LED light beads.

The above describes the technical principle of this invention with examples. The description just explains this invention's principle, and it cannot be interpreted as the limitation for protection scope of this invention in any manner. The drawings only show one of the implementation ways of this invention, and the actual structure is not restricted to it. On the basis of such interpretation, technicians of this field can associate other specific embodiments of this invention without creative work, and these embodiments will fall into the protection scope of this invention.

What is claimed is:

1. A drive circuit for transmitting data signals on power wire, comprising:
    a DC power module,
    a switching circuit module,
    a voltage division clamping circuit module,
    a receiving module and
    a control circuit module;
    the switching circuit module and the voltage division clamping circuit module are connected in parallel, a first end of the parallel circuit is connected to an input end of the receiving module, and a second end of the parallel circuit is connected to an anode of the DC power module;
    an output end of the receiving module is connected to a cathode of the DC power module;
    the control circuit module is connected to the switching circuit module, and controls the conduction and disconnection of the switching circuit module;
    when the switching circuit module is conducted, the DC power module will apply a first voltage to the receiving module through the switching circuit module, and when the switching circuit module is disconnected, the DC power module will apply a second voltage to the receiving module through the voltage division clamping circuit module;
    wherein the switching circuit module is a NMOS transistor, a source electrode of the NMOS transistor is connected to the cathode of the DC power module, a drain electrode of the NMOS transistor is connected to the output end of the receiving module, a grid electrode of the NMOS transistor is connected to a control signal output end of the control circuit module; and the input end of the receiving module is connected to the anode of the DC power module; or
    the switching circuit module is a PMOS transistor, a source electrode of the PMOS transistor is connected to the anode of DC power module, a drain electrode of the PMOS transistor is connected to the input end of receiving module, the grid electrode of the PMOS transistor is connected to the control signal output end of the control circuit module; and the output end of the receiving module is connected to the cathode of the DC power module.

2. The drive circuit for transmitting data signals on power wire according to claim 1, wherein
    the control circuit module is a microcontroller unit, wherein a VCC end and a GND end of the microcontroller unit are connected to a first voltage regulator diode (D2) in parallel, the VCC end of the microcontroller unit is connected to a cathode of the first voltage regulator diode (D2), and the GND end of the microcontroller unit is connected to an anode of the first voltage regulator diode (D2).

3. The drive circuit for transmitting data signals on power wire according to claim 2, wherein
    the voltage division clamping circuit module comprises a voltage divider resistor (R2) and a second voltage regulator diode (D3);
    if the switching circuit module is the NMOS transistor, a cathode of the second voltage regulator diode (D3) is connected to the anode of DC power module, an anode of the second voltage regulator diode (D3) is connected to a first end of the voltage divider resistor (R2) and the output end of the receiving module, a second end of the voltage divider resistor (R2) is connected to the VCC end of the microcontroller unit, and the GND end of the microcontroller unit is connected to the cathode of DC power module;
    if the switching circuit module is the PMOS transistor, the first end of the voltage divider resistor (R2) is connected to the GND end of the microcontroller unit, the second end of the voltage divider resistor (R2) is connected to the cathode of the voltage regulator diode (D3) and the input end of the receiving module, the anode of the voltage regulator diode (D3) is connected to the cathode of DC power module; and the VCC end of the microcontroller unit is connected to the anode of the DC power module.

4. The drive circuit for transmitting data signals on power wire according to the claim 3, further comprising
    a filter circuit module, which comprises a first resistor (R3) and a first capacitor (C3);
    a first end of the first resistor (R3) and a first end of the first capacitor (C3) are connected to the anode of the DC power module, and a second end of the first resistor (R3) and a second end of the first capacitor (C3) are connected to the cathode of the DC power module;
    the VCC end and the GND end of the microcontroller unit are connected to a second resistor (R1) and a second capacitor (C1) in parallel;
    the input end of the receiving module is connected to a third capacitor (C2) in parallel and is connected to a first diode (D1) in series;
    if the switching circuit module is the NMOS transistor, the output end of the receiving module is connected to an anode of the first diode (D1), a cathode of the third diode (D1) is connected to a first end of the third capacitor (C2) and the anode of the voltage regulator diode (D3), and a second end of the capacitor (C2) is connected to the input end of the receiving module;
    if the switching circuit module is the PMOS transistor, the input end of the receiving module is connected to the cathode of the first diode (D1), the anode of the diode first (D1) is connected to the cathode of the voltage regulator diode (D3) and the first of the third capacitor (C2), and the second end of the third capacitor (C2) is connected to the output end of the receiving module.

5. A drive circuit for transmitting data signals on power wire, comprising:
- a DC power module,
- a switching circuit module,
- a voltage division clamping circuit module,
- a receiving module and
- a control circuit module;
- the switching circuit module and the voltage division clamping circuit module are connected in parallel, a first end of the parallel circuit is connected to an input end of the receiving module, and a second end of the parallel circuit is connected to an anode of the DC power module;
- an output end of the receiving module is connected to a cathode of the DC power module;
- the control circuit module is connected to the switching circuit module, and controls the conduction and disconnection of the switching circuit module;
- when the switching circuit module is conducted, the DC power module will apply a first voltage to the receiving module through the switching circuit module, and when the switching circuit module is disconnected, the DC power module will apply a second voltage to the receiving module through the voltage division clamping circuit module;
- wherein the DC power module is an AC-DC constant-voltage source;
- wherein the receiving module comprises at least one LED lamp, wherein the LED lamp comprises a plurality of light-emitting diodes which are connected in series or in parallel and are connected to a current limiting circuit module in series, the anode of the LED lamp is the input end of the receiving module, a cathode of the LED lamp is connected to an input end of the current limiting circuit module, and an output end of the current limiting circuit module is the output end of the receiving module;
- wherein the current limiting circuit module comprises a first resistor (R4), a second resistor (R5), a first triode (Q1) and a second triode (Q2);
- a first end of the first resistor (R4) and a collector electrode of the second triode (Q2) are connected to an input end of the current limiting circuit module,
- a second end of the first resistor (R4) is connected to a base electrode of the second triode (Q2) and a collector electrode of the first triode (Q1),
- an emitter electrode of the second triode (Q2) is connected to a base electrode of the first triode (Q1) and one end of the second resistor (R5);
- an emitter electrode of the first triode (Q1) and a second end of the second resistor (R5) are connected to an output end of the current limiting circuit module.

\* \* \* \* \*